Figure 1:
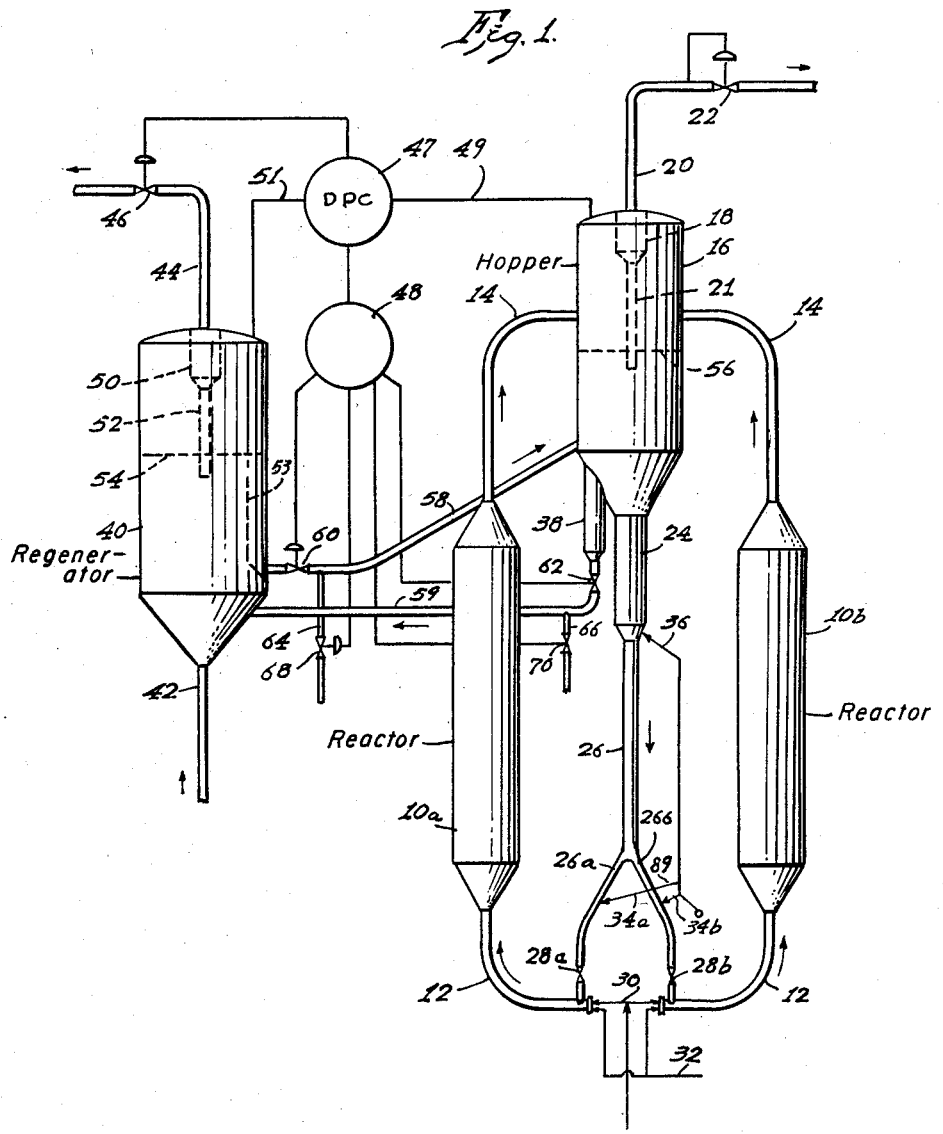

June 30, 1959  J. H. HIRSCH ET AL  2,892,773
FLUIDIZED PROCESS AND APPARATUS FOR THE TRANSFER
OF SOLIDS IN A FLUIDIZED SYSTEM
Filed Dec. 29, 1953  2 Sheets-Sheet 1

INVENTORS.
Joel H. Hirsch and
Jerry McAfee.
BY
ATTORNEY:

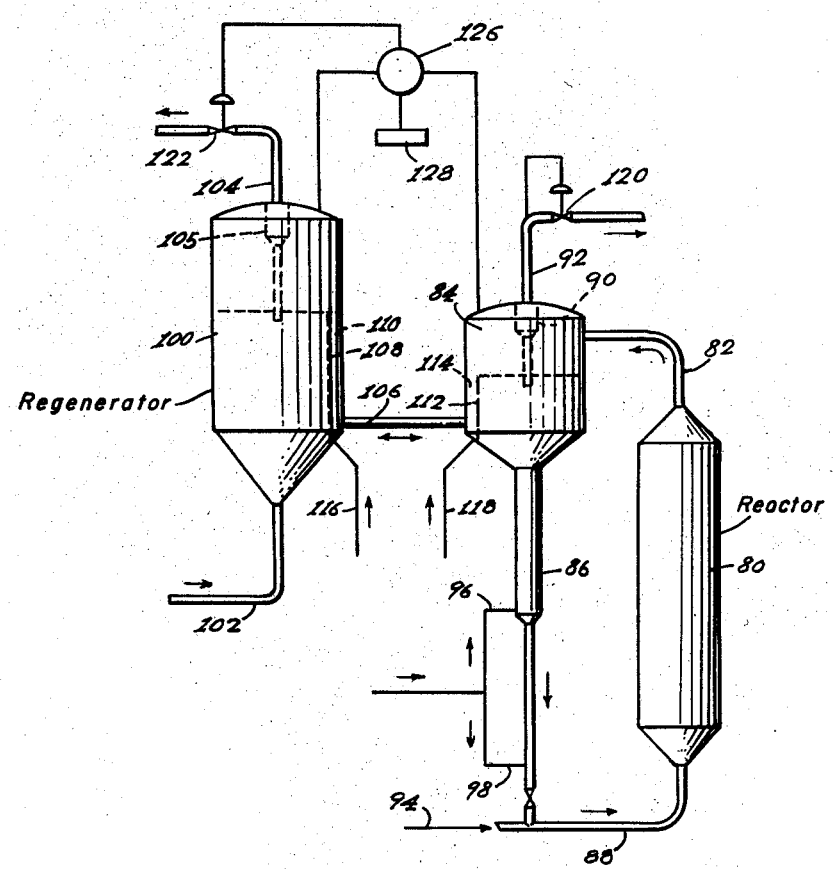

United States Patent Office 2,892,773
Patented June 30, 1959

2,892,773

FLUIDIZED PROCESS AND APPARATUS FOR THE TRANSFER OF SOLIDS IN A FLUIDIZED SYSTEM

Joel H. Hirsch and Jerry McAfee, Oakmont, Pa., assignors to Gulf Research & Development Company, Pittsburgh, Pa., a corporation of Delaware Application December 29, 1953, Serial No. 401,014

9 Claims. (Cl. 208—213)

This invention relates to processes in which a dense phase of fluidized, finely divided, solid particles is suspended in a fluid bed by a stream of gases and more particularly to the circulation of the fluidized solid particles and their transfer while suspended in a dense phase between two vessels in a cyclical process.

In processes using the fluidized solids technique to obtain intimate contact between the solid particles and a gaseous phase, finely divided solid particles are suspended in a dense phase in a reaction vessel by an upwardly flowing gas whereby the solid particles are maintained in a condition of hindered settling to form a fluid bed of solid particles. The fluid bed of solid particles resembles a vigorously boiling liquid in appearance, being extremely turbulent with bubbles of gas rising through it, and, when the dense phase fluid bed does not fill the entire vessel, having a well defined upper level or surface above which some particles are normally entrained in a dilute phase by the ascending gas.

The fluidized technique is particularly advantageous in processes in which the solid particles are subjected to one atmosphere and set of reaction conditions in a first vessel and a different atmosphere and set of reaction conditions in a second reaction vessel, and the solid particles are transferred continuously or cyclically between the two reaction vessels. Frequently the purpose of transferring the solid particles from one vessel to another, and back, is to heat the particles in one vessel and thereby transfer heat to the other vessel. In other instances, notably fluid catalytic cracking processes, solid catalyst particles are transferred from a reactor to a regenerator in which the activity of the catalyst is restored, and then back to the reactor. In still other processes, the fluidized solid particles may be one of the reactants, and are consumed and replaced during the process.

The driving force for circulating the finely divided solid particles between the two vessels is usually the "hydrostatic" head developed by a column of dense phase, fluidized particles in a standpipe. The particles are discharged from the lower end of the standpipe into a transfer gas which then ordinarily carries the particles upwardly in a dilute phase of low density to the other vessel. Slide valves at the bottom of the standpipe are generally used to control the rate at which the fluidized particles are discharged from the standpipe.

The driving force available for the transfer of the fluidized solid particles from one reaction vessel to another is limited in the conventional fluid bed process. Increasing the length of the standpipe to increase the driving force generally necessitates supporting the apparatus at a considerable height above the ground, if the driving force is to be increased appreciably, which increases the cost of construction of the apparatus for the fluid process. The amount of increase in the driving force which may be obtained by increasing the density of the fluidized solids in the standpipe is also limited. Aeration gas is usually introduced at the bottom of the standpipe to maintain fluidization of the solid particles, and the aeration gas obviously reduces the density of the dense phase in the standpipe. Attempts to increase the driving force available for the transfer of the fluidized particles by means of mechanical feeders, such as screw feeders or star feeders, have not been generally successful because of abrasion of the mechanical feeders and the high cost of the very large feeders necessary to obtain the high rates of flow of solid particles that are required in many processes.

The limited driving force available for transfer of the fluidized particles results in a very narrow range of operability in many fluidized processes. A temporary upset in the conditions in either reaction vessel may be sufficient to cause reversal of flow of the solid particles and attendant gases in apparatus and processes not designed for flow reversals. In some instances, reversal of flow may cause the formation of explosive mixtures of gases in either or both reaction vessels.

In the co-pending application of Jerry McAfee entitled Transfer of Fluidized Solids, Serial No. 401,011 and filed on December 29, 1953, a process and apparatus are described for the transfer of solid particles in a cyclical manner between two reaction vessels. The invention described in that application obtains transfer of the fluidized solid particles through a transfer line connecting the two reaction vessels by changing the direction of the pressure differential between the two vessels periodically. It is thus possible to control the pressure drop between the two reaction vessels to obtain the desired high flow rates of solid particles. Since at any instant the transfer of fluidized particles between the two vessels is proceeding in only one direction, it is not necessary to transfer the solid particles from one vessel to a vessel at a higher pressure. However, there is a fluctuation in the level of the fluid bed of solid particles in both of the reaction vessels, which in some processes, for example in catalytic cracking, might be objectionable because of variations in the depth of the bed and the time of contact with the catalyst particles.

This invention resides in a fluid bed process and apparatus therefor in which fluidized particles are circulated continuously from a hopper through a reaction vessel in the form of a fluidized dense phase of solid particles suspended in a first reaction gas, and back to the hopper where the first reaction gases are separated from the solid particles. Transfer of fluidized solid particles from the hopper to a second reaction vessel in which the particles are suspended in a second reaction gas is obtained by changing the direction of the pressure differential between the hopper and the second reaction vessel periodically to cause cyclical flow between those two vessels.

Figure 1 of the drawings is a diagrammatic flow sheet of a process for the hydrodesulfurization of residual petroleum oils according to an embodiment of this invention.

Figure 2 is a diagrammatic flow sheet of another embodiment of this invention.

This invention may be employed in a wide variety of fluidized process in which solid particles are transferred cyclically from one reaction vessel to another, regardless of whether the solid particles act as a reactant, a catalyst, or merely a heat transfer medium. The method of transfer of fluidized solid particles comprising this invention is especially valuable for reactions performed at high pressures. In many high pressure processes, the pressure differential between the two vessels will be only a very small percent of the total pressure on the vessels. Variations in pressure of a very small percent of the total pressure on either vessel will cause large percentage variations in the pressure differential between the two vessels and make difficult close control of the flow rates between the two vessels.

The fluidized solid particles may have a particle size ranging ordinarily from 0 to 1000 microns, and more commonly from 0 to 200 microns. The particles, which may be, for example, a finely ground powder or in the form of microspheres, are suspended in a dense phase, hindered-settling state within the reaction vessels by ascending reaction or aeration gases. The density of the dense phase may vary widely, depending upon the rate of flow of the aeration gases and the density of the particular solid particles. Typical dense phase densities of fluidized catalytic cracking catalysts are of the order of 15 to 35 pounds per cubic foot.

This invention is particularly suitable for processes in which a constant depth fluid bed is desired to permit operation at substantially optimum times of contact between the solid particles and reaction gases. In some processes, excessive times of contact will cause degradation of desired reaction products, undesirable side reactions, or both. For example, in the fluidized catalytic cracking of hydrocarbons, contact of the hydrocarbons with the fluidized catalyst particles for excessive periods will result in over-cracking of the hydrocarbons with loss of yield resulting from the formation of excessive amounts of coke and gas.

For purposes of illustration, a specific embodiment of this invention will be described as applied to the hydrodesulfurization of residual petroleum oils. Clearly this invention is not limited to this specific process or to fluidized processes in which the fluidized particles are of a catalytic nature. Referring to the drawing, a reactor is illustrated as consisting of two vessels 10a and 10b which are arranged in parallel with respect to the reactant materials and catalysts flowing through them. Reactors 10a and 10b are identical units, and being connected in parallel, are the equivalent of a single reaction vessel of larger diameter and may be considered as such. In some instances, such as in reactions performed at high pressures, construction may be simplified by using a plurality of small reactors in place of a single reactor of large diameter, or the two reactors as illustrated above.

Each of the reactors 10a and 10b is equipped with an inlet line 12 at its lower end and an outlet line 14 at its upper end. The outlet lines 14 discharge at their upper end into a hopper 16, which is a vessel of relatively large diameter constructed to withstand the pressures under which the reactors 10a and 10b are operated.

A separator 18 is mounted within the hopper 16 at its upper end for separating entrained catalyst particles from gaseous reaction products and communicates directly with an outlet line 20 discharging the reaction products from the hopper to apparatus for recovery of the reaction products, not shown. The separated catalyst particles are returned downwardly into a dense phase fluid bed in hopper 16 through a dip leg 21 extending from the lower end of the separator 18. A pressure control valve 22 in outlet line 20 allows control of the rate of flow through that line and thereby controls the pressure on the hopper 16 and reactors 10a and 10b.

Extending from the lower end of the hopper 16 is a standpipe 24 in which catalyst particles collect for recirculation through the reactors 10a and 10b. A catalyst circulation line 26 connects the lower end of the standpipe 24 with the lower end of inlet lines 12. The circulation line 26 is divided near its lower end into two sections designated as 26a and 26b for delivery of the catalyst to reactors 10a and 10b respectively. Slide valves 28a and 28b allow control of the rate of flow of fluidized catalyst particles through each of lines 26a and 26b respectively.

Opening into each of the inlet lines 12 at its lower end is a residual hydrocarbon charge line 30 through which the residual oil to be hydrosulfurized is introduced into the system. Also opening into the lower end of each of the inlet lines 12 is a hydrogen supply line 32. Aeration of the fluidized catalyst particles in circulation line 26 and standpipe 24 is accomplished by introduction of an aeration gas, preferably hydrogen, through lines 34a and 34b and 36.

The hopper 16 is provided with a second standpipe 38 for collection of catalyst particles to be delivered to a second reaction vessel designated as a regenerator 40. The regenerator 40 is provided with an inlet line 42 at its lower end for the introduction of an oxygen-containing gas and an outlet line 44 for flue gases at its upper end. A pressure regulating valve 46 in the outlet line 44 controls the rate of flow of flue gases through the outlet line and thereby controls the pressure on the regenerator 40.

Pressure regulating valve 46 is actuated by a differential pressure controller 47 connected to hopper 16 through line 49 and regenerator 40 through line 51 to control the difference in pressure between the regenerator 40 and hopper 16. The differential pressure controller 47 is in turn actuated by a timer 48 to control the direction of the pressure differential.

Suspended within the regenerator 40 is a separator 50, the outlet of which communicates with outlet line 44. A dip line 52 extends from the lower end of separator 50 into a dense phase fluid bed within the regenerator 40 for return of catalyst particles separated from the effluent flue gases. The generator 40 may be provided with a well 53 down through which fluidized catalyst particles removed from the regenerator pass.

During the operation of the apparatus illustrated, a dense phase fluid bed of fluidized solid particles is maintained in the lower portion of each of the regenerator 40 and hopper 16. The normal upper surface of the fluid bed in the regenerator 40 is indicated by reference numeral 54 and the upper surface of the fluid bed in hopper 16 is indicated by reference numeral 56.

A first transfer line 58 extends from the lower end of the well 53 in regenerator 40 to hopper 16. Transfer line 58 preferably opens into the hopper 16 below the upper surface 56 of the fluid bed. A slide valve 60 in transfer line 58 adjacent the regenerator 40 permits complete closing of transfer line 58. A second transfer line 59 extends from the lower end of standpipe 38 in the hopper 16 to the regenerator 40, and preferably opens into the fluid bed in the regenerator. A slide valve 62 in the transfer line 59 permits complete closing of that line.

An aeration gas line 64 opens into the first transfer line 58 adjacent valve 60 and a similar aeration gas line 66 opens into the second transfer line adjacent valve 62. The aeration gas lines 64 and 66 are provided with control valves 68 and 70, respectively, for control of the flow of aeration gas into the transfer lines. Each of slide valves 60 and 62 and control valves 68 and 70, as well as differential pressure controller 47 is connected to the timer 48 and actuated thereby in accordance with the desired schedule to control the rate and direction of flow of fluidized solid particles between the hopper 16 and regenerator 40.

In operation, a dense phase fluid bed of any conventional hydrogenation catalyst for the hydrogenation of petroleum hydrocarbons is maintained in the hopper 16 and regenerator 40. The term "hydrogenation catalysts" includes without being limited to, iron group metals, compounds of iron group metals, such as the oxides, either singly or in combination. Also included within the scope of the term are group VI metals, such as molybdenum or tungsten, and compounds such as the oxides or sulfides of those metals, either singly or in combination. The catalyst may be carried on any suitable catalyst support such as kieselguhr, silica-alumina composites, etc. The catalyst particles are of a size suitable for fluidization, and generally have a diameter of 0 to 1000 microns, and more desirably from 0 to 200 microns.

A residual oil, for example 17 to 20 percent bottoms of a Kuwait crude, either alone or blended with other stocks such as a furnace oil, is introduced through line 30 into inlet line 12 where it is mixed with catalyst from circulation line 26 and hydrogen from line 32. The charge stock may also be any stock suitable for hydrodesulfurization, such as a whode crude, a topped crude, or a gas oil but this specific example will be described employing a residual oil as a charge stock. In spite of the high boiling point of the residual hydrocarbons, the high ratio of catalyst to oil, the high temperature, and the presence of the hydrogen, results in the formation of a fluidized dense phase which passes upwardly through the inlet lines 12, reactors 10a and 10b and outlet lines 14. The dense phase of reaction products and catalysts overflows from outlet lines 14 into the hopper 16 which is of sufficiently large diameter to disengage the gaseous reaction products from the catalyst particles. The reaction products continue upward through the separator 18 in which any entrained catalyst particles are separated and then through outlet line 20 and valve 22 to product recovery or storage equipment, not shown. The catalyst separated from the reaction products in the hopper 16 drops into the fluid bed within the hopper and into the standpipe 24 from which it is continuously recirculated through circulation line 26 to the reactors 10a and 10b.

In the hydrodesulfurization reaction, the reactors 10a and 10b are maintained at a temperature in the range of 750° to 950° F. by suitable preheating of the residual oil charged to the unit and heating of the catalyst particles in the regenerator in the manner to be described later. The reactors are maintained at a pressure ranging from 250 to 2000 pounds per square inch, and more desirably in the range of 500 to 1000 pounds per square inch. The catalyst to oil ratio, by weight, in the reactors is maintained in the range of 10:1 to 25:1 and the linear velocity of the gaseous phase passing upwardly through the reactors is in the range of 0.05 to 3 feet per second. Hydrogen is charged to the reactors at the rate of 1000 to 20,000 cubic feet per barrel of feed to the reactor.

Continued circulation of the catalyst from the hopper 16 through the reactors 10a and 10b will result in contamination of the catalyst through build-up of carbon on the catalyst particles. In order to maintain the activity of the catalyst and the optimum reaction conditions in the reactor, a portion of the catalyst is periodically transferred to the regenerator 40 wherein the carbon is burned from the catalyst particles and the catalyst heated thereby. This is accomplished by timer 48 actuating differential pressure controller 47 which opens valve 46 to increase the flow through outlet line 44 and thereby reduce the pressure on the regenerator 40. When the pressure on regenerator 40 falls below the pressure on the hopper 16, timer 48 opens slide valve 62 and aeration gas control valve 70 whereupon catalyst particles pass through the second transfer line 59 to the regenerator 40. Prior to this period the timer 48 has closed slide valve 60 and aeration gas inlet valve 68.

The transfer of the fluidized catalyst in the form of a dense phase from the hopper 16 to the regenerator 40 allows large quantities of catalysts to be transferred at low velocities and low pressure drop. Since the slide valve 62 will ordinarily be wide open during the transfer there is no appreciable throttling through the valve and as a result abrasive wear of the valve and the pressure drop through the valve is low.

Continued transfer of the catalyst particles through transfer line 59 from the hopper 16 to the regenerator 40 causes a drop in the catalyst level in the hopper. Since the catalyst and reaction gases are separated as they enter the hopper through outlet lines 14, and the catalyst drops to the fluid bed in the hopper while the reaction gases pass to the outlet line 20, variations in the position of upper surface 56 of the fluid bed have substantially no effect upon the time of contact of the catalyst with the hydrocarbons.

After the desired amount of catalyst has been transferred from the hopper 16 to the regenerator 40, timer 48 actuates valve 62 to stop the flow of catalysts through transfer line 59. Oxygen-containing gas passing upwardly through the regenerator 40 from inlet line 42 oxidizes the carbonaceous deposits and thereby regenerates the catalysts. The regenerator 40 is ordinarily maintained at a temperature in the range of about 800° to 1300° F. The temperature may be controlled within this range by dilution of the air employed as the oxygen-containing gas with inert gases such as flue gases or steam, or by heat exchange by means of a suitable heat exchanger in the fluid bed, for example.

After a predetermined period, the length of which will depend upon the particular apparatus design, the timer 48 actuates differential pressure control 47 which in turn partially closes control valve 46 to reduce momentarily the flow of flue gases through outlet line 44 and thereby increase the pressure on the regenerator 40. When the pressure on the regenerator 40 is higher than the pressure on the hopper 16, timer 48 opens slide valve 60 and aeration gas control valve 68 and closes aeration gas control valve 70 to transfer fluidized solid particles of catalysts from the regenerator 40 through well 53 and transfer line 58 to the hopper 16. The valves remain set in this condition for a period sufficient to transfer the desired amount of regenerated catalysts to the hopper 16 after which control valve 60 is closed, and the system returned to its original condition. Ordinarily a stripping gas is injected into the lower end of well 53 and standpipe 38 to strip occluded materials from the catalyst particles prior to entering the transfer lines. The hydrodesulfurization in reactors 10a and 10b, and the regeneration in regenerator 40, proceed continuously, regardless of the operation of the timer to cause transfer of catalyst between the hopper 16 and regenerator 40.

The operation of the timer has been described for a process in which catalyst flows from the hopper to the regenerator, followed by a period in which there is no flow between the hopper and regenerator while regeneration proceeds, after which the catalyst is transferred from the regenerator to the hopper. Clearly the timer 48 may be adjusted to operate in a manner to allow flow in either one direction or the other between the regenerator and the hopper at substantially all times. It is a feature of this invention, however, that the fluidized catalyst particles flow in only one direction between the regenerator and hopper at any one instant. The instrumentation described for the control of the pressure on the apparatus and the pressure differential between the hopper 16 and regenerator 40 is merely illustrative of one type which will accomplish the desired control. Other apparatus well known to those skilled in the art may be employed to accomplish the pressure control without departing from this invention.

Ordinarily, flow from the hopper 16 to the regenerator 40 will be followed by a flow in a reverse direction and the flow of catalyst particles will be of an alternating nature. In some instances, however, it may be desirable to transfer the catalyst from the hopper 16 to the regenerator 40 in successive slugs which may be accomplished by repeated opening and closing of the slide valves 60 or 62 without changing the direction of the pressure differential between the hopper 16 and the regenerator 40. It will be appreciated that a series of slugs may be considered substantially equivalent of the transfer of the same mass of catalyst particles in a single slug, and, as far as the catalyst particles are concerned, the flow is alternately from the regenerator 40 to the hopper 16 and back from the hopper 16 to the regenerator 40.

The period of operation of the timer 48 for the reversal of the flow of the fluidized catalyst particles will be determined by the permissible variations in the characteristics or condition of the solid particles in the reactors. These, in turn, will depend upon the nature of the reaction taking place in the fluid process, for example in a catalytic process, the rate of contamination of the catalyst. Where the reaction is highly endothermic or highly exothermic or where the contamination of the catalyst is severe, such as in catalytic cracking processes the cycle will be short and high total flow rates between the hopper 16 and regenerator 40 must be maintained. Where the rate of contamination of catalysts is low or the heat requirements of the reaction are low, as in the hydrodesulfurization process described, the total transfer of catalysts between the hopper 16 and the regenerator 40 will be low and the cycle may be correspondingly long.

In the embodiment of the invention illustrated in Figure 2, a reactor 80 has an outlet line 82 which discharges into a hopper 84. A standpipe 86, extending from the lower end of hopper 84, connects at its lower end with an inlet line 88 to the reactor 80 for circulation of fluidized solid particles through the reactor in a manner similar to that disclosed for the embodiment of the invention illustrated in Figure 1. Hopper 84 is provided with a separator 90 for separation of solid particles from the reaction products discharged through an outlet line 92.

The feed stock to the process is introduced into the reactor through a feed line 94 which discharges into inlet line 88. Aeration of the fluidized particles in standpipe 86 is accomplished by aeration gas introduced through lines 96 and 98.

A reactor 100, herein called a regenerator to distinguish it from reactor 80, is provided with a reaction gas inlet line 102 at its lower end and a reaction product line 104 at its upper end. A separator 105 in the regenerator 100 separates entrained solid particles from the reactor and returns them to a fluid bed in the regenerator.

Regenerator 100 and hopper 84 are joined by a transfer line 106 which opens into each of the vessels below the upper level of a fluid bed of the solid particles in the vessels. The opening of the transfer line 106 into the regenerator 100 is shielded by a baffle 108 which forms a well 110 extending upwardly from the opening of the transfer line in regenerator 100. A similar baffle 112 defines a similar well 114 in hopper 84. Aeration gas is introduced into wells 110 and 114 through lines 116 and 118, respectively.

Instrumentation for control of the pressure in the apparatus is similar to that described for Figure 1. The pressure in the hopper 84 and the reactor 80 is controlled by a valve 120 in line 92. The pressure on the regenerator 100 is controlled by a valve 122 in line 104, which is actuated by a differential pressure controller 126 connected to the hopper 84 and the regenerator 100. A timer 128 actuates the differential pressure controller according to a desired schedule.

In operation, a pressure drop from the hopper 84 to the regenerator 100 will cause flow of fluid particles down well 114, through transfer line 106 and then up well 110 into the regenerator 100. When the direction of the pressure drop is reversed, by operation of the timer, the fluidized solid particles are transferred through the line 106 to the hopper 84. Meanwhile fluidized particles are continuously circulated through the reactor 80 and the time of contact between the fluidized particles and the reaction gases is maintained constant. Reversal of the direction of the pressure drop and control of the pressure drop are obtained through operation of timer 128 and differential pressure controller 126.

This invention provides a process and apparatus in which continual circulation of fluidized solid particles through a reactor may be maintained and the effective height of the fluid bed remains constant. Meanwhile the fluidized solid particles employed in the reaction may be transferred to and from a separate reaction vessel for treatment with different reaction gases. A high pressure differential for transfer of the catalyst particles to and from the second reaction vessel may be maintained without the expense and disadvantages encountered with very long standpipes or mechanical solid particle feeding devices.

We claim:

1. A process for contacting fluidized solid particles with reaction gases at a substantially constant set of conditions in a fluid bed in a first reaction zone and at a different substantially constant set of conditions in a fluid bed in a second reaction zone and transferring the solid particles between the first and second reaction zones in a fluidized dense phase comprising maintaining a storage zone at substantially the same pressure as the pressure on the first reaction zone, continuously circulating the fluidized particles from the storage zone through the first reaction zone and back to the storage zone, collecting solid particles circulated from the first reaction zone in a fluid bed of solid particles in the storage zone, maintaining a transfer zone open between the fluid bed in the storage zone and the fluid bed in the second reaction zone, periodically changing the pressure on the second reaction zone to change periodically the direction of the pressure differential between that reaction zone and the storage zone to transfer fluidized solid particles through the transfer zone in a dense phase alternately from the second reaction zone to the storage zone and from the storage zone to the second reaction zone.

2. A process for contacting fluidized solid particles with reaction gases and transferring the fluidized particles cyclically between a first reaction zone containing a fluid bed of solid particles maintained at substantially constant conditions and a second reaction zone containing a fluid bed of solid particles maintained at substantially constant conditions different from the conditions in the first reaction zone comprising maintaining a storage zone at substantially the same pressure as the first reaction zone, continuously circulating fluidized solid particles in the form of a dense phase from the storage zone through the first reaction zone and back to the storage zone, passing reaction gases through the first reaction zone to the storage zone with the dense phase of solid particles, disengaging the reaction gases and solid particles in the storage zone to maintain a substantially constant and effective depth of fluid bed of solid particles in contact with the reaction gases, maintaining a transfer zone open between the storage zone and second reaction zone, periodically changing the pressure on the second reaction zone to change periodically the direction of the pressure differential between the second reaction zone and the storage zone to transfer fluidized solid particles through the transfer zone alternately from the second reaction zone to the storage zone and from the storage zone to the second reaction zone.

3. In a process in which fluidized solid particles are subjected to one substantially constant set of reaction conditions in a first reaction zone and a different substantially constant set of reaction conditions in the second reaction zone and the fluidized solid particles are transferred through a first transfer zone from the second reaction zone to a storage zone and through a second transfer zone from the storage zone to the second reaction zone, the improvement comprising maintaining the storage zone at substantially the same pressure as the first reaction zone, continuously circulating a dense phase of solid particles through the first reaction zone and storage zone, increasing the pressure on the second reaction zone to a pressure higher than the pressure on the storage zone, opening the first transfer zone to flow from the second reaction zone to the storage zone and closing the second transfer zone to flow from the storage zone to the second reaction zone whereby fluidized solid particles are delivered from the second reaction zone to the storage zone, reducing the pressure on the second reaction zone to a pressure below the pressure on the storage zone, opening the second transfer zone to flow from the storage zone to the second reaction zone and closing the first transfer zone to flow from the second reaction zone to the storage zone whereby fluidized solid particles are delivered from the storage zone to the second reaction zone, and repeating the alternate increasing and decreasing of the pressure on the second reaction zone to transfer solid particles alternately from the second reaction zone to the storage zone and from the storage zone to the second reaction zone.

4. In a fluidized process in which finely divided solid particles suspended in a dense phase fluid bed are alternately subjected to one set of substantially constant conditions in a first reaction zone and a different substantially constant set of conditions in a second reaction zone, a process for contacting the solid particles with reaction gases and transferring the solid particles between the two reaction zones in the form of a fluidized dense phase of solid particles comprising the steps of maintaining a storage zone at a substantially uniform pressure substantially the same as the pressure on the first reaction zone, withdrawing a column of fluidized solid particles in a dense phase from a fluidized bed of particles in the storage zone downwardly from the storage zone, mixing reactants with the solid particles discharged from the bottom of the dense phase column, passing the solid particles upwardly from the bottom of the column in a dense phase fluidized condition of less density than in the column through the first reaction zone and to the storage zone to maintain continuous circulation of solid particles through the storage zone and first reaction zone, and periodically changing the pressure on the second reaction zone from above the pressure on the storage zone to below the pressure on the storage zone and back to a pressure higher than the pressure in the storage zone to change periodically the direction of the pressure differential between the second reaction zone and the storage zone to transfer fluidized solid particles through a transfer zone opening into the fluid bed in the second reaction zone and the bed in the storage zone alternately from the second vessel to the storage zone and then from the storage zone to the second vessel.

5. In a process for the hydrodesulfurization of petroleum hydrocarbons in which the petroleum hydrocarbons are passed in contact with a dense phase fluid bed of a hydrogenation catalyst at substantially constant conditions in a reaction zone and the hydrogenation catalyst is regenerated in a fluid bed of hydrogenation catalyst at substantially constant conditions in a regeneration zone, the improvement comprising maintaining a storage zone containing a fluidized bed of hydrogenation catalyst at substantially the same pressure as the reaction zone, circulating hydrogenation catalyst in the form of a fluidized dense phase continuously from the storage zone upwardly through the reaction zone and from the reaction zone back to the storage zone, passing the petroleum hydrocarbon to be hydrodesulfurized and hydrogen upwardly through the reaction zone, discharging the dense phase of catalyst and reaction gases from the reaction zone into the storage zone and disengaging the reaction gases from the dense phase of catalyst, reducing the pressure on the regeneration zone below the pressure on the storage zone and transferring catalyst particles in a dense phase from the storage zone to the regeneration zone through a transfer zone opening at one end into the bed of catalyst in the storage zone and at the other end into the fluid bed in the regeneration zone, passing an oxygen-containing gas in contact with the catalyst in the regeneration zone under conditions to ignite carbon on the catalyst and thereby regenerate the catalyst, increasing the pressure on the regeneration zone to a pressure higher than the pressure on the storage zone thereby transferring regenerated catalyst through the transfer zone from the regeneration zone to the storage zone, the pressure on the regeneration zone alternating from a pressure higher than the pressure on the storage zone to a pressure lower than the pressure on the storage zone and back to a pressure higher than the pressure on the storage zone to change periodically the direction of the pressure differential between the regeneration zone and the storage zone and thereby transfer catalyst alternately from the storage zone to the regeneration zone and from the regeneration zone to the storage zone, the catalyst moving between the regeneration zone and storage zone in only one direction at any instant.

6. A process for the hydrodesulfurization of petroleum hydrocarbons comprising passing the hydrocarbons upwardly through a fluidized bed of a hydrogenation catalyst maintained at substantially constant conditions including a temperature of 750° to 950° F. and a pressure in the range of 250 to 2000 p.s.i., in a reaction zone, introducing hydrogen into the fluidized bed at the rate of 1000 to 2000 cubic feet per barrel of hydrocarbons, circulating hydrogenation catalyst from a storage zone into the reaction zone and from the reaction zone back into the storage zone, discharging a fluidized dense phase of hydrogenation catalyst and reaction products from the storage zone through a transfer zone to a regeneration zone while the pressure on the storage zone is maintained higher than the pressure on the regeneration zone, stripping the stream of catalyst particles of reaction products as it enters the transfer zone, passing an oxygen-containing gas continuously upwardly through a fluidized bed of catalyst particles in the regeneration zone to ignite carbon on the catalyst and thereby regenerate the catalyst, increasing the pressure on the regeneration zone to a pressure higher than the pressure on the storage zone, transferring regenerated catalyst in a fluidized dense phase from the regeneration zone through a transfer zone to the storage zone while the regeneration zone is at a higher pressure than the storage zone, stripping the regenerated catalyst of oxygen-containing gases prior to entrance into the transfer zone for delivery to the storage zone, and alternating the pressure on the regeneration zone from a pressure higher than the pressure on the storage zone to a pressure lower than the pressure on the storage zone and back to a pressure higher than the pressure on the storage zone to change periodically the direction of the pressure differential between the storage zone and the regeneration zone and thereby transfer catalyst alternately from the storage zone to the regeneration zone and from the regeneration zone to the storage zone, the catalyst moving between the regeneration zone and the storage zone in only one direction at any instant.

7. Apparatus for contacting fluidized solid particles with reaction gases in two reaction vessels and cyclically transferring the solid particles between the reaction vessels comprising a first reaction vessel and a second reaction vessel, a hopper positioned to receive effluent products from the top of the first reaction vessel, a standpipe extending downwardly from the lower end of the hopper, an inlet line communicating with the lower end of the standpipe and the lower end of the first reaction vessel, an open outlet line from the top of the first reaction vessel into the upper portion of the hopper, a first transfer line from the second reactor to the hopper, a first valve in said first transfer line, a second standpipe extending from the hopper constructed and arranged to receive solid particles therein, a second transfer line extending from the lower end of the second standpipe to the second reaction vessel, a second valve in said second transfer line, a pressure controller for varying the pressure on the second reaction vessel cyclically from a pressure higher than to a pressure lower than the pressure on the hopper, and timing means for actuating the pressure controller and said first and second valves whereby the first valve is open and the second valve is closed when the pressure on the second reaction vessel is higher than the pressure on the hopper and the first valve is closed and the second valve is open when the pressure on the second reaction vessel is lower than the pressure on the hopper.

8. Apparatus for contacting fluidized solid particles with reaction gases at one set of conditions in a first reaction vessel and at a different set of conditions in a second reaction vessel and cyclically transferring the solid particles between the vessels, comprising a hopper, a fluidized bed of solid particles in each of the reaction vessels and hopper, a standpipe extending downwardly from the hopper, a transfer line communicating with the standpipe at its lower end and opening into the first reaction vessel at its lower end, an open outlet line extending from the upper end of the first reaction vessel into the hopper near its upper end, means for circulating fluidized particles from the fluid bed in the hopper through the standpipe upwardly through the first reaction vessel and back to the hopper, a transfer line extending from the hopper to the second reaction vessel, a baffle plate in the fluidized beds in each of the hopper and the second reaction vessel providing wells into which the transfer line opens, a pressure controller on at least one of the hopper and the second reaction vessel adapted to change the pressure on one of the hopper and second reaction vessel from a pressure lower to a pressure higher than the pressure on the other, and timing means operatively connected to the pressure controller to actuate the pressure controller periodically to periodically reverse the direction of the pressure differential between the hopper and the second reaction vessel to reverse periodically the direction of flow of solid particles between the hopper and the second reaction vessel.

9. Apparatus for contacting fluidized solid particles with reaction gases at one substantially constant set of conditions in a first reaction vessel and at a different set of substantially constant conditions in a second reaction vessel comprising a first reaction vessel and a second reaction vessel, a hopper containing a fluidized bed of the solid particles, a standpipe extending from the lower portion of the hopper, an inlet line connected to the lower end of the standpipe and opening into the lower end of the first reactor, an outlet line from the first reactor continuously open into the hopper above the bed of solid particles therein, a fluidized bed of solid particles in the second reactor, a transfer line between the second reactor and the hopper opening into the fluidized bed in the second reactor and the bed of solid particles in the hopper, a pressure controller for controlling the pressure on the second reaction vessel at a high pressure higher than the pressure on the hopper and at a low pressure lower than the pressure on the hopper and for changing the pressure from one level to the other, and timing means connected to the pressure controller to actuate the pressure controller periodically to change the pressure on the second reaction vessel from one level to the other and thereby periodically reverse the direction of flow between the hopper and the second reaction vessel.

References Cited in the file of this patent

UNITED STATES PATENTS

| | | |
|---|---|---|
| 2,363,274 | Wolk et al. | Nov. 21, 1944 |
| 2,390,244 | Finlayson | Dec. 4, 1945 |
| 2,414,852 | Burnside et al. | Jan. 28, 1947 |
| 2,420,129 | Flock et al. | May 6, 1947 |
| 2,456,035 | Wobker | Dec. 14, 1948 |
| 2,464,812 | Johnson | Mar. 22, 1949 |
| 2,557,680 | Odell | June 19, 1951 |
| 2,560,356 | Liedholm | July 10, 1951 |
| 2,584,378 | Beam | Feb. 5, 1952 |
| 2,601,676 | Trainer et al. | June 24, 1952 |
| 2,604,436 | Adey et al. | July 22, 1952 |
| 2,655,464 | Brown et al. | Oct. 13, 1953 |